July 17, 1934.  C. O. WILSON  1,966,745
COMBINED PIPE COUPLING AND VALVE DEVICE
Filed May 23, 1932
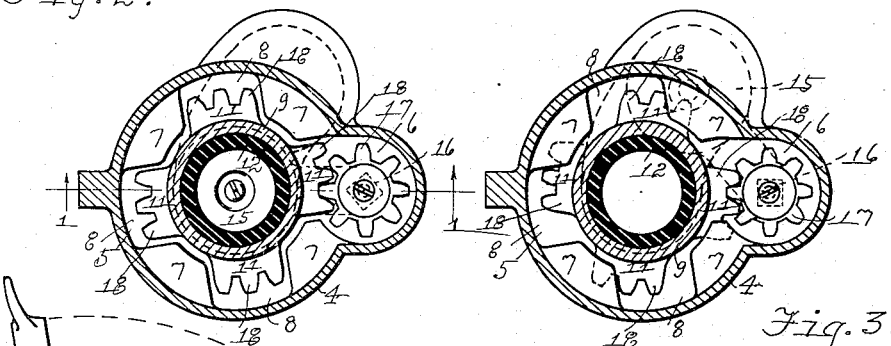
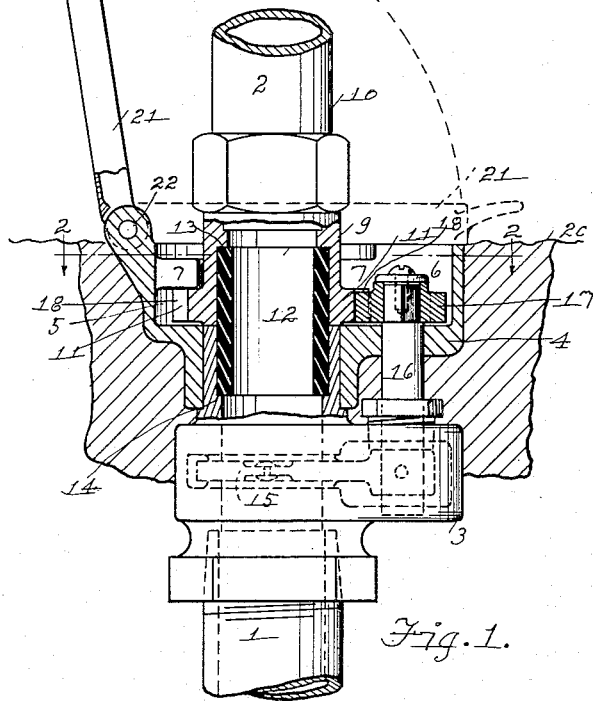
Witness:
Geo L. Chapel
INVENTOR.
Charles O. Wilson
BY
Rice and Rice
ATTORNEYS Patented July 17, 1934

1,966,745

UNITED STATES PATENT OFFICE 1,966,745

COMBINED PIPE-COUPLING AND VALVE DEVICE

Charles O. Wilson, Muskegon, Mich.

Application May 23, 1932, Serial No. 613,016

2 Claims. (Cl. 284—18)

The present invention relates to combined pipe-coupling and valve devices; and its object is to provide an improved device of that character wherein a pair of pipes may be coupled and uncoupled and a valve opening and closing the passage through the same be operated simultaneously or nearly so and by the same manual operation.

This and any other and more specific objects hereinafter appearing are attained by, and the invention finds preferable embodiment in, the illustrative device particularly described in the body of this specification and shown by the accompanying drawing, in which:

Figure 1 is an elevational view of a combined pipe-coupling and valve device, partially sectioned vertically on line 1—1 of Figure 2;

Figure 2 is a horizontal sectional view thereof taken on line 2—2 of Figure 1;

Figure 3 is a similar sectional view of the same but showing the parts in another position.

In the drawing is illustrated a device of the type shown in my pending application, Serial Number 605,820, filed April 18, 1932, but improved thereover in certain respects.

The present device comprises the water pipes 1, 2, one of which—the lower pipe 1 as shown—has an extension through which the water passes from pipe 1 to pipe 2 in their illustrated coupled relation, this extension being composed of a lower member 3 screwed on the main portion of pipe 1 and an upper member 4 in tightly fitting relation with said lower member.

This upper member 4 has in its upper side a recess whose main portion 5 is approximately circular but has a side portion 6 approximately half circular, in the horizontal cross sectional views of said portions seen in Figures 2 and 3. Said main portion 5 is provided with parts, the lugs 7, extending radially inwardly and angularly spaced apart at 8. The upper pipe 2 has at its lower end an extension or collar portion 9 which may be mounted turnably about the main portion 10 of said upper pipe. This upper pipe, i. e. its lower or collar portion 9, is provided with parts, the lugs 11, extending radially outwardly and angularly spaced apart correspondingly with the parts or lugs 7 of the lower pipe 1.

In the relatively turned position of pipe 2 (or its portion 9) and the pipe 1 as shown in Figure 2, the parts or lugs 7 of pipe 2 may be inserted between the lugs 11 of pipe 1, and passing below the same, the pipe 2 (or collar portion 9) may be turned about its axis relatively to pipe 1 to the position shown in Figure 3 wherein the lugs 7 and 11 mutually engage or interlock to hold the pipes together in coupled relation.

A tubular compressible packing member 12, contacting at its ends the shoulders 13 and 14 of the pipes respectively, may be applied as shown to tightly close the joint between the pipes.

A valve 15 being in the shown construction a gate valve, is mounted on the lower pipe 1 in its extension portion 3 and is turnable by its rock shaft 16 to the position closing the passage through the pipes as seen in Figures 1 and 2, or to the position indicated in Figure 3 opening said passage. This valve has, fixed on its shaft 16 a gear or toothed segment 17, and the upper pipe 2 (or its collar portion 9) has a toothed segment 18 (a plurality of such segments formed on the outer edges of the lugs 11 of pipe 2 being shown), the segments of the two pipes meshing in the pipe's assembled position, so that the turning of pipe 2 (or its collar portion 9) about its axis turns or operates the valve.

When the upper pipe 2 is turned "clockwise" from its position seen in Figures 2 and 1, its lugs 11 pass under the lugs 7 of the lower pipe to couple the pipes, and by the same movement or operation and simultaneously the valve 15 is turned to its position opening the water passage through the pipes, the parts being now in the position shown in Figure 3; and when the pipe 2 is turned reversely the valve is closed and the pipes uncoupled.

In the drawing the device is shown seated below the surface 20 of the ground and is installed for sprinkling and irrigating purposes. It will thus be seen that the valve is automatically operated by turning the upper pipe 2 (or its collar portion 9) by hand or by a wrench applied thereto, no handle being necessary for operating the valve. A lid 21 turnably mounted at 22 may be employed for closing the recess 5, 6 when the upper pipe is removed.

In the arrangement of the parts as shown in the drawing, the passage through the pipes is opened by the valve when the pipes are coupled, and is closed when the pipes are uncoupled.

I claim:

1. In a device of the class described: a pair of pipes having radially extending lugs movable, by the relatively turning movement of the pipes about their axis, from and to mutually engaging position coupling the pipes; a valve mounted on one of the pipes turnable about an axis laterally offset from the axis of the pipes to and from a position closing the passage therethrough, the other pipe and the valve having meshing toothed segments for turning the valve by the turning movement of said other pipe, the lugs of one pipe being inserted between the lugs of the other pipe and the segments being moved into meshing relation by the axial relative movement of the pipes.

2. In a device of the class described: a pair of pipes having radially extending lugs movable, by the relatively turning movement of the pipes about their axis, from and to mutually engaging position coupling the pipes; a gate valve mounted on one of the pipes turnable about an axis laterally offset from and parallel with the pipes' axis to and from a position closing the passage through the pipes, the other pipe and the valve having meshing toothed segments for turning the valve by the turning movement of said other pipe.

CHARLES O. WILSON.